United States Patent
Korcz et al.

(10) Patent No.: US 8,013,243 B2
(45) Date of Patent: Sep. 6, 2011

(54) ADD-A-DEPTH RING AND COVER PLATE ASSEMBLY

(75) Inventors: Krzysztof W. Korcz, Granger, IN (US);
Kenneth Moehle, Granger, IN (US);
Mahran Husain, South Bend, IN (US)

(73) Assignee: Hubbell Incorporated, Shelton, CT (US)

( * ) Notice: Subject to any disclaimer, the term of this patent is extended or adjusted under 35 U.S.C. 154(b) by 455 days.

(21) Appl. No.: 12/188,547

(22) Filed: Aug. 8, 2008

(65) Prior Publication Data

US 2010/0032180 A1 Feb. 11, 2010

(51) Int. Cl.
*H01H 9/02* (2006.01)
*H01H 13/04* (2006.01)

(52) U.S. Cl. .............. 174/57; 174/53; 174/50; 174/481; 220/3.2; 220/3.3; 248/906

(58) Field of Classification Search .................. 174/480, 174/481, 50, 53, 57, 58; 220/3.2–3.9, 4.02; 248/906, 343; 439/535; D13/152
See application file for complete search history.

(56) References Cited

U.S. PATENT DOCUMENTS

| 740,663 | A | 10/1903 | Krantz | |
|---|---|---|---|---|
| 754,414 | A | 3/1904 | Bossert | |
| 848,888 | A | 4/1907 | Erickson | |
| 915,381 | A | 3/1909 | Pullets | |
| 1,875,101 | A | 8/1932 | Morrell | |
| 2,048,611 | A * | 7/1936 | Franz | 174/57 |
| 2,209,146 | A | 7/1940 | Bessette | |
| 2,378,861 | A | 6/1945 | Peevey | |
| 2,707,221 | A | 4/1955 | Frank | |
| 2,989,206 | A | 6/1961 | McAfee | |
| 3,525,450 | A | 8/1970 | Payson | |
| 3,651,245 | A | 3/1972 | Moll | |
| 4,087,624 | A * | 5/1978 | Hitchcock | 174/57 |
| 4,634,015 | A * | 1/1987 | Taylor | 220/3.7 |
| 4,918,259 | A | 4/1990 | Hanson | |
| 5,012,043 | A | 4/1991 | Seymour | |
| 5,117,996 | A * | 6/1992 | McShane | 174/57 |
| 5,931,325 | A | 8/1999 | Filipov | |
| 6,369,322 | B1 * | 4/2002 | Gretz | 174/50 |
| 6,820,760 | B2 | 11/2004 | Wegner et al. | |
| 6,953,894 | B2 * | 10/2005 | Ungerman et al. | 174/58 |
| 7,038,131 | B1 | 5/2006 | Gretz | |
| 7,235,739 | B2 * | 6/2007 | King et al. | 174/58 |
| 7,259,328 | B1 | 8/2007 | Gretz | |
| 7,276,661 | B2 | 10/2007 | Wegner et al. | |
| 7,301,099 | B1 | 11/2007 | Korcz | |
| 7,495,170 | B2 * | 2/2009 | Dinh et al. | 174/58 |
| 7,531,743 | B2 * | 5/2009 | Johnson et al. | 174/57 |
| 2008/0035363 | A1 | 2/2008 | Yan | |

FOREIGN PATENT DOCUMENTS

DE 3309346 9/1984

* cited by examiner

*Primary Examiner* — Angel R Estrada
(74) *Attorney, Agent, or Firm* — Garrett V. Davis; Mark S. Bicks; Alfred N. Goodman

(57) ABSTRACT

An adjustable depth cover plate assembly includes a top plate and an adjustable sleeve to compensate for different spacing between the outer surface of a wall and the front side of an electrical box. The adjustable cover plate is positioned on the electrical box with the end of the sleeve abutting the electrical box. Mounting screws of an electrical wiring device pass through an opening in the top plate of the cover plate into the electrical box whereby the cover plate is captured between the wiring device and the electrical box. The length of the sleeve of the cover plate is adjustable by providing frangible score lines or telescoping members.

22 Claims, 5 Drawing Sheets

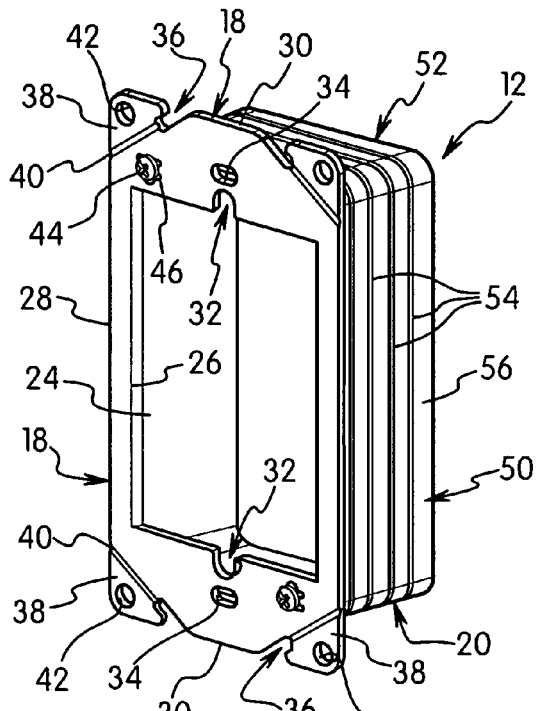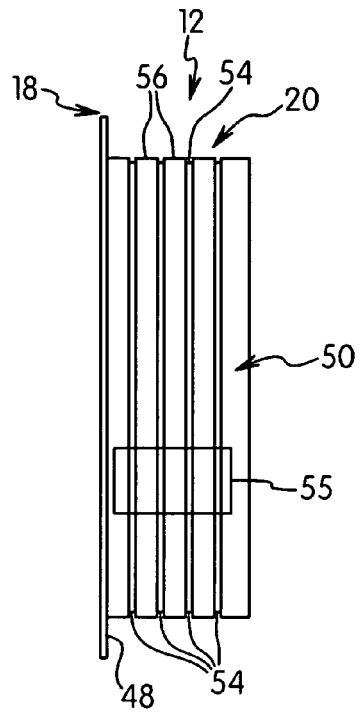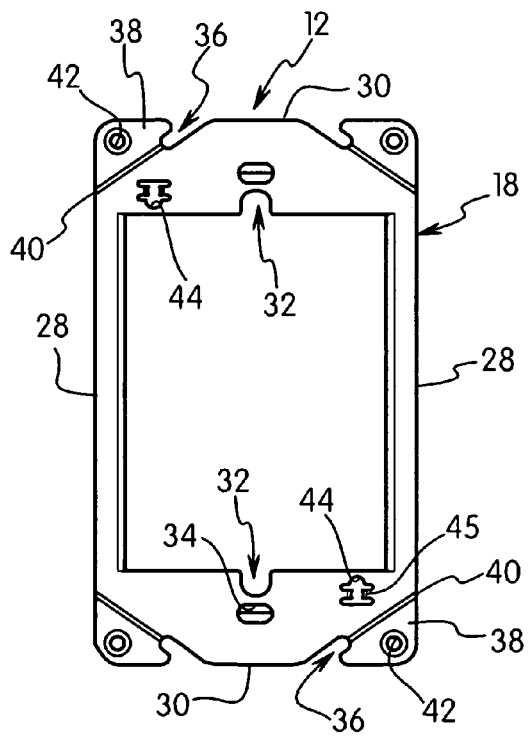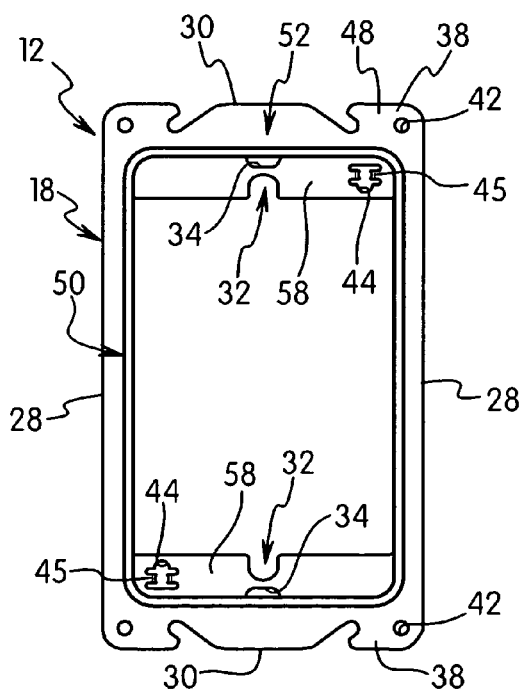

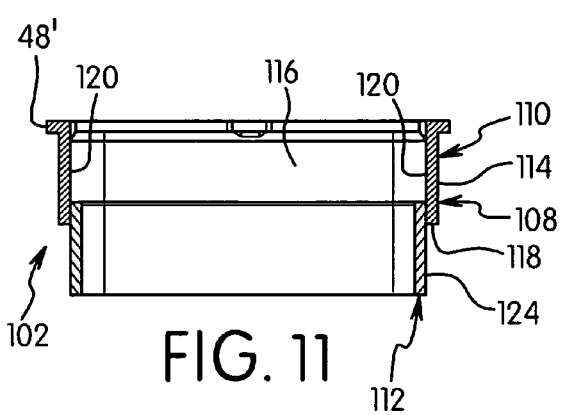
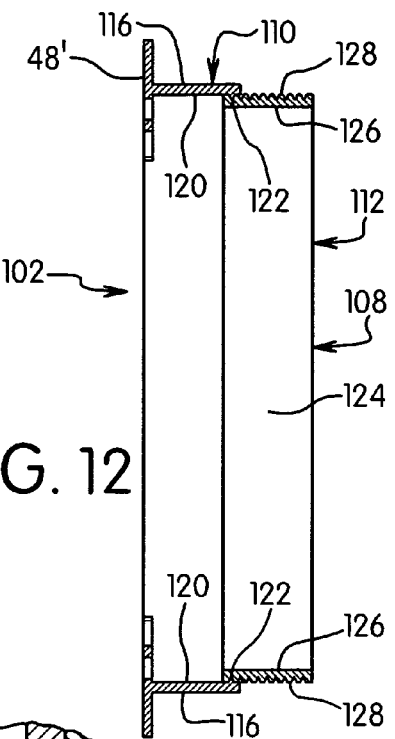
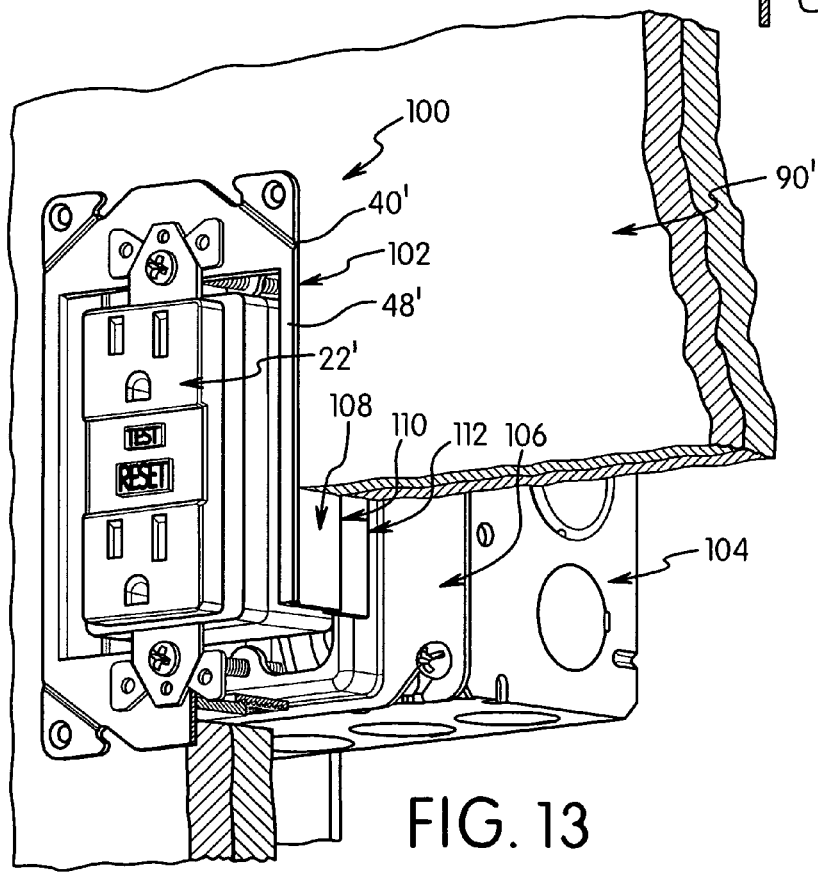

ADD-A-DEPTH RING AND COVER PLATE ASSEMBLY

FIELD OF THE INVENTION

The present invention is directed to an adjustable depth ring and cover plate assembly for use with an electrical outlet box that can be attached to an electrical junction box. The invention is further directed to an adjustable depth ring and electrical box cover plate assembly where the ring has a sleeve with a longitudinal length that can be adjusted to extend between the outer surface of the wall and the electrical box to compensate for different wall thicknesses. The adjustable depth ring and cover plate assembly supports an electrical wiring device at a desired position in relation to the exterior surface of the wall and the electrical box.

BACKGROUND OF THE INVENTION

Electrical boxes are generally attached to a wall stud or other support structure for supporting an electrical device and enclosing electrical wiring. The electrical boxes are mounted in a variety of positions, orientations, and locations in the wall or ceiling by the use of nails, screws, or other fasteners. In new construction, the electrical box is attached to the wall stud or other support structure with the open front face of the electrical box facing outward. Generally, the open front face of the electrical box is positioned outwardly from the wall stud a distance corresponding to the thickness of the wall material or membrane so that the front edge of the electrical box is flush with the outer surface of the wall. In some forms of construction, the stud or other support structure does not allow a proper orientation of the electrical box so that the open end of the electrical box is recessed within the wall when the wall material is attached to the wall stud. This makes it difficult to mount the electrical wiring device to the electrical box while being properly oriented with respect to the front face of the wall. The electrical wiring device must be securely attached to the electrical box which often results in the wiring device being recessed with respect to the outer surface of the wall.

Renovating old construction can also create difficulties in positioning the electrical box with respect to the outer surface of the wall. The new wall board or paneling can be applied over the existing wall so that the original electrical box is recessed within the wall and spaced from the front surface of the wall. It is generally very difficult to move an electrical box within an existing wall and to reposition the electrical box without damaging the existing wall so that the front face of the electrical box is flush with the outer surface of the wall. The recessed electrical box often results in the electrical device being recessed with respect to the front surface of the wall.

Various devices have been produced that include an adjustable assembly for connecting to an outlet box that can accommodate different thicknesses of wall structures. These devices typically provide a mechanism for positioning the electrical device in a desired location with respect to the outer surface of the wall structure. These prior devices generally require a series of movable and adjustable components that are attached directly to the electrical box prior to installing the wall. After the wall is attached to the wall stud, the device is adjusted to position the electrical device in the desired location with respect to the outer surface of the wall.

An example of such a device is disclosed in U.S. Pat. No. 4,634,015 to Taylor. This device includes a plate and an open collar on the mounting plate and circling a central opening. A box frame slides within the collar to contact the side walls of the collar. The box frame is adjusted outwardly with respect to the collar by adjustment screws mounted in the box frame and connected to a frame on the collar or on the mounting plate.

Another example of an adjustable mud ring is disclosed in U.S. Pat. No. 5,931,325 to Filipov. The adjustable mud ring for the electrical box has a plate that can be attached to a conventional electrical box. The adjustable mud ring has a collar extending outwardly from the plate and a movable sleeve surrounds the collar. The sleeve is attached to the collar by screws that adjust the position of the sleeve with respect to the collar.

A further example is disclosed in U.S. Pat. No. 7,301,099 to Korcz. This device includes a base plate having a central opening and a collar encircling the central opening. A sleeve slides through the collar and is adjusted by adjustment screws extending between the sleeve and inwardly extending legs on the base plate.

Other examples of electrical box extension devices are disclosed in U.S. Pat. No. 6,820,760 and U.S. Patent Application Publication No. 2005/0051354 and 2005/0082079 to Wegner et al. The adjustable assemblies disclosed in these patents and published applications include an electrical box extension having an extending member for a switch or electrical receptacle. The extension member includes fastener brackets and a fastener base bracket. The fasteners extend through the fastener brackets of the base bracket to adjust the position of the extending member with respect to the base. Another form of adjustable extension members for electrical boxes include a base attached to the electrical box and a sleeve extending outwardly from the base plate. The sleeve can include frangible or breakable lines so that the length of the sleeve can be shortened to position the end of the sleeve in a desired location with respect to the outer surface of the wall. Examples of this type of device are disclosed in U.S. Pat. No. 2,989,206 to McAfee, U.S. Pat. No. 3,525,450 to Payson and U.S. Pat. No. 3,651,245 to Moll.

The prior devices have been generally suitable for the intended purpose. However, there is a continuing need in the industry for an improved adjustable device for mounting an electrical component to an electrical box.

SUMMARY OF THE INVENTION

The present invention is directed to an adjustable depth ring and electrical box cover plate assembly that can be attached to an electrical box to position an electrical wiring device in a desired location with respect to the electrical box and with respect to the outer surface of a wall. The invention is particularly directed to an electrical box and an adjustable depth electrical box cover plate assembly that can compensate for different wall thicknesses while being able to position the electrical box in a selected position.

Accordingly, one aspect of the invention is to provide an electrical box cover plate assembly that can be attached to an electrical box where the cover plate assembly has a sleeve with a length that can be adjusted for adjusting the position of the electrical device with respect to the electrical box and/or the wall surface.

A further aspect of the invention is to provide an electrical box cover plate assembly that can be attached to the electrical box after the wall structure is attached to the wall stud without the need to remove portions of the wall to access and relocate the electrical box. The adjustable cover plate assembly can be coupled to an existing electrical box mounted within a wall where the length of the assembly can be selected to position an electrical wiring device in a desired location.

A further feature of the invention is to provide an electrical box cover plate assembly having a top plate for contacting the outer surface of the wall structure. An electrical device such as an electrical receptacle is mounted onto the top plate and screws from the electrical device extend through openings in the cover plate and are threaded into threaded holes in the electrical box. The threads are tightened so that the cover plate assembly is captured between the electrical device and the electrical box by the mounting screws of the electrical device. In this embodiment of the invention, the cover plate assembly does not include separate screws or other fasteners for coupling the cover plate to the electrical box. The screws from the electrical device are able to clamp the cover plate in position and into contact with the front face of the electrical box.

Still another aspect of the invention is to provide an adjustable cover plate assembly that can be operatively connected directly to an existing mud ring attached to an electrical box. The cover plate assembly includes a sleeve that can fit around the existing mud ring and come into direct contact with the outer face of the base plate of the mud ring.

Another aspect of the invention is to provide an adjustable length cover plate assembly for coupling to an electrical box where the cover plate includes a planer top plate having an access opening with a dimension sufficient to receive an electrical wiring device. The cover plate has an outer edge with a dimension to contact an outer surface of a wall. The access opening defines an inner edge of the top plate. The cover plate also includes a sleeve coupled to a bottom face of the top plate around the inner edge which extends substantially perpendicular to the top plate and spaced inwardly from the outer edge. The sleeve is constructed to have a longitudinally adjustable length. In one embodiment, the sleeve has frangible score lines which can be broken by the user to shorten the length of the sleeve. In an alternative embodiment, the sleeve includes a first ring member coupled directly to the top plate and a second ring member that is slidably connected to the first ring member in a telescoping fashion.

The various aspects of the invention are also attained by providing an electrical box assembly including an electrical box having an open front end and an adjustable cover plate connected to the electrical box. The adjustable cover plate has a planar top plate with an access opening for receiving an electrical wiring device. The top plate has an inner edge defined by the access opening and an outer edge. The top plate has a dimension to contact an outer surface of a wall and to support the electrical wiring device. The adjustable cover plate also has a sleeve coupled to a bottom face of a top plate around the inner edge which extends substantially perpendicular to the top plate. The sleeve is spaced inwardly from the outer edge of the top plate and has an adjustable axial length with an axial end contacting the electrical box.

The various aspects of the invention are also attained by providing a method for coupling an electrical wiring device to an electrical box comprising the steps of coupling and electrical box to a support structure having a wall membrane attached to the support structure where the wall membrane has an opening aligned with an opening in the electrical box. An adjustable cover plate is positioned on an outer surface of the wall membrane opposite the electrical box. The cover plate has a top plate with an inner edge defining an access opening and an outer edge. A sleeve is coupled to the bottom face of the top plate and has an axial end spaced outwardly from the top plate. The cover plate is positioned with the sleeve extending through an opening in the wall membrane and has the axial end of the sleeve abutting the electrical box. The bottom face of the cover plate contacts the outer surface of the wall membrane. The electrical wiring device is coupled to the adjustable cover plate and the electrical box by a screw extending from the wiring device through an opening in the cover plate within the perimeter defined by the sleeve and threaded into a threaded hole in the electrical box.

These and other aspects of the invention will become apparent from the following detailed description of the invention, which taken in conjunction with the annexed drawings, disclose various embodiments of the invention.

BRIEF DESCRIPTION OF THE DRAWINGS

The following is a brief description of the drawings in which:

FIG. 2 is a front perspective view of the cover plate of FIG. 1;

FIG. 3 is a side view of the cover plate of FIG. 2;

FIG. 4 is a top plan view of the cover plate of FIG. 2;

FIG. 5 is a bottom view of the cover plate of FIG. 2;

FIG. 11 is a cross sectional end view taken along line 11-11 of FIG. 8;

FIG. 12 is a cross sectional side view taken along line 12-12 of FIG. 8; and FIG. 13 is a perspective view in partial cross section of the cover plate assembly and electrical box mounted to a wall structure.

DETAILED DESCRIPTION OF THE INVENTION

The present invention is directed to an electrical box and an adjustable depth cover plate assembly. More particularly, the invention is directed to an adjustable cover plate that has an adjustable length to accommodate for different wall thicknesses. The cover plate assembly has a length which can be shortened or lengthened to enable an electrical wiring device to be positioned in a desired location with respect to the surface of the wall.

Referring to FIGS. 1-6, the electrical box assembly 10 in a first embodiment includes an adjustable depth cover plate 12 and an electrical box 14. In the embodiment illustrated, a mud ring 16 is attached to the front face of electrical box 14.

Figure 1:
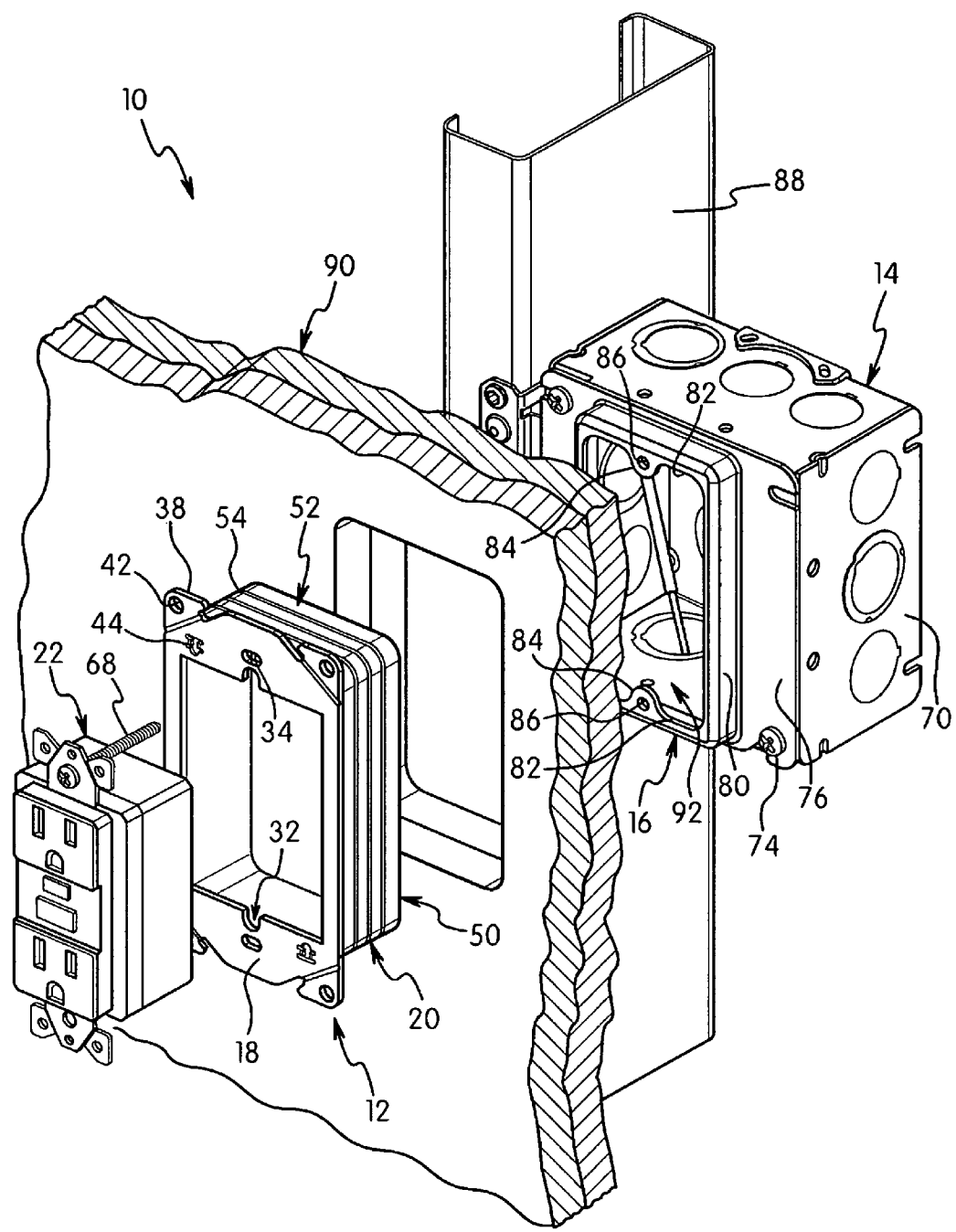
FIG. 1 is an exploded perspective view showing the adjustable depth cover plate and an electrical box in a first embodiment of the invention.

Cover plate 12 has a length that can be adjusted to accommodate for variations in the depth of the opening in the wall and the spacing between the outer surface of the wall and the electrical box. As shown in FIGS. 1 and 2, cover plate 12 includes a top member in the form of a plate 12 and a sleeve 20. Top plate 18 has a substantially flat planar configuration with a generally rectangular shape in the embodiment shown. In the embodiment illustrated, cover plate 12 is constructed for supporting a single electrical device 22. In alternative embodiments, cover plate 12 can be a multi-gang unit for supporting multiple electrical wiring devices and can have a generally square shape or other shape to accommodate the electrical wiring devices. Cover plate 12 is preferably made from a rigid plastic material but can also be made from a metal material.

Top plate 18 has an access opening 24 with a dimension sufficient to receive the electrical wiring device 22 and for mounting the wiring device to the top plate 18. Access opening 24 defines an inner edge 26 of top plate 18. Top plate 18 has outer side edges 28 and outer end edges 30. In the embodiment illustrated, inner edge 26 has screw openings in the form of substantially U-shaped notches 32 at opposite ends for receiving mounting screws. Apertures 34 are also formed in top plate 18 spaced outwardly from notches 32 for receiving a screw or other fastener as needed. In the embodiment illustrated, notches 32 are open to the access opening 24. In other embodiments, tabs can be formed on the inner edge of top plate 18 to define apertures where the tabs can be removed by cutting or breaking to form the open notches 32.

Outer ends 30 of top plate 18 include angled slots 36 and removable corner tabs 38. Removable corner tabs 38 are connected to the main portion of top plate 18 by a frangible score line 40. Corner tabs 38 can be removed as desired by cutting or bending and breaking along score line 40. Corner tabs 38 are also provided with an aperture 42 for receiving mounting screws to attach the top plate to a wall membrane or support structure as desired. Two apertures 44 are provided adjacent inner edge 26 at each end for receiving a mounting screw 46 during shipping of cover plate 12. FIG. 1 depicts the cover plate 12 as provided to the installer from the manufacturer in one embodiment of the invention. Mounting screws that are typically provided with conventional electrical wiring devices have a length that is sufficient for a single wall thickness. In one embodiment, screws 46 have a length greater than standard screws to compensate for an increased depth of the opening in the wall and the increased spacing between the outer surface of the wall and the electrical box mounted in the wall. The screws 46 are retained in the apertures 44 by a tab 45 until removed by the installer.

Sleeve 20 extends from a rear face 48 of cover plate 18. Sleeve 20 has a longitudinal length and an inner dimension to receive the electrical wiring device 22. In the embodiment illustrated, sleeve 20 has a substantially rectangular shape corresponding to the shape of access opening 26 with side walls 50 adjacent inner edge 26 of top plate 18 and end walls 52 spaced outwardly from inner edge 26 as shown in FIG. 5. As shown in FIG. 5, sleeve 20 defines a flange portion 58 of top plate 18 that extends inwardly with respect to sleeve 20. Preferably, end walls 52 of sleeve 20 are spaced outwardly from U-shaped notches 32 and apertures 34. Sleeve 20 defines a ring-like structure having an adjustable length that can extend between top plate 18 and electrical box 14. In the embodiment illustrated, sleeve 20 has a rectangular shape. Preferably, sleeve 20 has a shape complementing the access opening 26, the opening in the electrical box and/or the opening in the mud ring 16.

Sleeve 20 has a plurality of score lines 54 in the embodiment illustrated for reducing the longitudinal length of sleeve 20. Score lines 54 are spaced apart by predetermined increments so that the user can select the length of the sleeve as needed. Score lines 54 define a plurality of sections 56 that can be separated by bending, breaking, or cutting along score lines 54 to reduce the length of sleeve 20 as desired. In one embodiment, suitable indicia 55 shown in FIG. 3 is provided on the outer surface of sleeve 20 indicating a length of sleeve 20. The indicia can be printed directly on the sleeve 20 or a label which can be attached to the sleeve. The indicia can extend around the entire periphery of the sleeve or only a portion, as desired. Sleeve 20 can be cut along the selected markings by a utility knife or saw to reduce the length of the sleeve 20, as desired.

Sleeve 20 can be made from various materials such as metal or plastic. In one embodiment of the invention, sleeve 20 is formed from plastic as a single integrally formed one piece unit. Sleeve 20 is molded directly with top plate 18 as a one piece unit. In alternative embodiments, sleeve 20 can be formed as a separate unit and attached to the bottom face of top plate 18 by a suitable fastening system such as by welding, adhesive or mechanical fasteners.

Electrical wiring device 22 in the embodiment shown is a duplex receptacle having a body 60, a front face 62 with aperture 64 for receiving the prongs of a plug and mounting tabs 66. Electrical wiring device 22 has a standard construction as known in the art. Mounting screws 68 extending through apertures in mounting tabs 66 are provided for mounting electrical wiring device 22 to electrical box 14.

Electrical box 14 is a standard electrical box having an open front face with side walls 70. In the embodiment illustrated, a standard mud ring 16 is attached to electrical box 14 by mounting screws 74. Mud ring 16 has a base plate 76 with a plurality of apertures or slots 78 for receiving mounting screws 74. Base plate 76 is formed with a collar 80 spaced inwardly from the outer edges of base plate 76 and extends substantially perpendicular to the plane of base plate 76. Collar 80 typically has a height corresponding to the thickness of a standard wall. Collar 80 has an inwardly extending flange 82 with mounting tabs 84 having threaded aperture 86.

Tabs 84 and threaded apertures 86 of mud ring 16 are positioned for receiving mounting screws 68 of electrical wiring device 22. The screws 68 can be replaced by the longer auxiliary screws 46 as needed to secure electrical wiring device 22. In the embodiment illustrated, electrical box 14 is a standard 4 inch square electrical box. Collar 80 of mud ring 16 has a height corresponding to a standard thickness of wall board used for general construction. Tabs 84 extend inwardly from flange 82 a distance sufficient to receive the mounting screws 68 without interfering with body 60 of electrical wiring device 22.

In use, electrical box 14 is mounted directly to a wall stud 88 or other support structure according to conventional practices. Appropriate wiring is supplied to the interior of electrical box 14 for connecting with wiring device 22. Mud ring 16 can then attach to the front open end of electrical box 14. The wall substrate 90 is then attached to the wall stud 88 according to conventional procedures. In the embodiment illustrated in FIG. 6, two layers of standard plasterboard are attached to wall stud 88 and overlying mud ring 16 and electrical box 14. An opening is cut into wall substrate 90 to expose the access opening 92 in mud ring 16.

Figure 6:
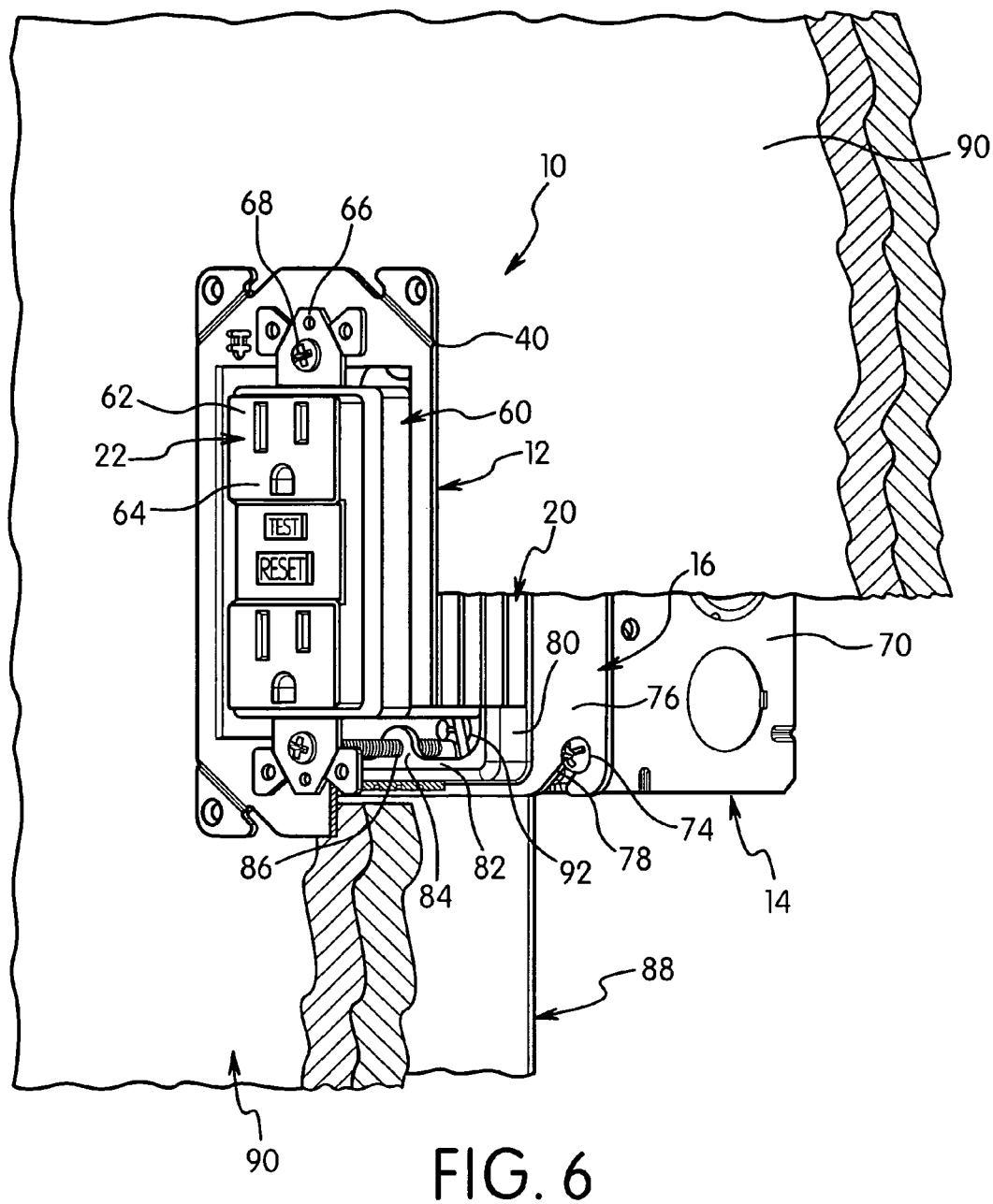
FIG. 6 is a perspective view in partial cross section showing the cover plate and the electrical box mounted to a wall.

Sleeve 20 of cover plate 12 is inserted through the opening cut in wall substrate 90 and aligned with collar 80 of mud ring 16. Preferably, sleeve 20 has an outer dimension complimenting the outer dimension of collar 80 of mud ring 16 so that sleeve 20 slides over the outer surface of collar 80 as shown in FIG. 6. The longitudinal length of sleeve 20 is adjusted by removing the appropriate number of sections 56 by separating along score lines 44 so that sleeve 20 fits over the outer surface of collar 80 and the bottom face 94 contacts the outer surface 96 of wall 90. Preferably, the opening in wall 90 is at least equal to the outer dimension of sleeve 20 and less than the outer dimension of top plate 18.

Electrical wiring device 22 is connected to the wires (not shown) contained within electrical box 14 and positioned on top plate 18 as shown in FIG. 6. Body 60 of wiring device 22 extends into sleeve 20 and into access opening 92 in mud ring 16. Mounting screws 68 of wiring device 22 extend through notches 32 in top plate 18 and are threaded into threaded apertures 86 of mud ring 16. Screws 68 are tightened to draw mounting tabs 66 of wiring device 22 into contact with the outer face of top plate 18 and to capture cover plate 12 between mounting tabs 66 of wiring device 22 and electrical box 14. In the embodiment illustrated, cover plate 12 is secured by coupling wiring device 22 directly to mud ring 16. Preferably, cover plate 12 is not fastened to mud ring 16 or electrical box 14 by separate fasteners or other fastening mechanisms.

In the present invention, wiring device 22 and cover plate 12 are attached to electrical box 14 and mud ring 16 after the wall substrate 90 is attached to wall stud 88. It is not necessary to mount cover plate 12 to electrical box 14 or mud ring 16 prior to installation of the wall substrate as in the prior devices. The longitudinal length of sleeve 22 can be reduced as needed to accommodate the thickness of wall substrate 90 and the spacing between the outer surface of wall substrate 90 and the threaded apertures 86 in mud ring 16. In the embodiment shown in the drawings, the cover plate 12 is coupled directly to the mud ring 16. In other embodiments, the mud ring 16 can be eliminated and the cover plate 12 attached directly to the electrical box.

Cover plate 12 can be used in connection with restoration work where a second new layer of wall board is attached over an existing wall. The electrical wiring device can be removed from the electrical box or mud ring prior to or after the second layer of wall board is attached. The cover plate 12 is then positioned on the electrical box and the electrical wiring device reattached.

FIGS. 7-12 show a second embodiment of the electrical assembly 100 of the invention. Electrical assembly 100 includes a cover plate 102 having a sleeve 108 and an electrical box 104. In the embodiment illustrated, a mud ring 106 is attached to electrical box 104 as in the previous embodiment. The mud ring 106 can be eliminated as desired. Electrical assembly 100 is similar to assembly 10 except for the construction of sleeve 108 so that identical components are identified by the same reference number with the addition of a prime.

Figure 7:
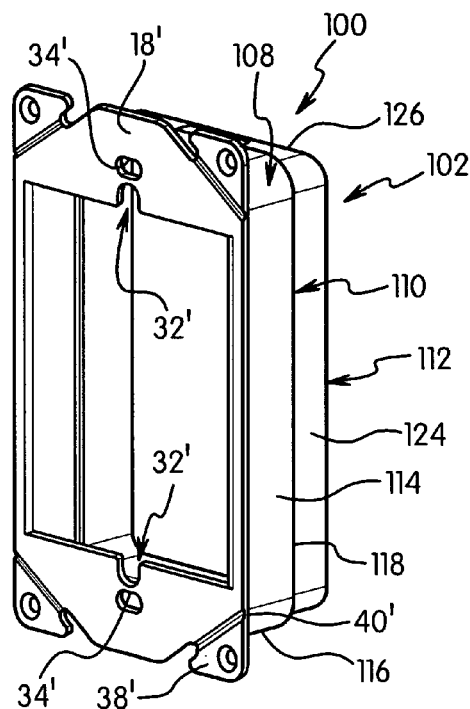
FIG. 7 is a side perspective view of the cover plate assembly in the second embodiment of the invention.
Figure 8:
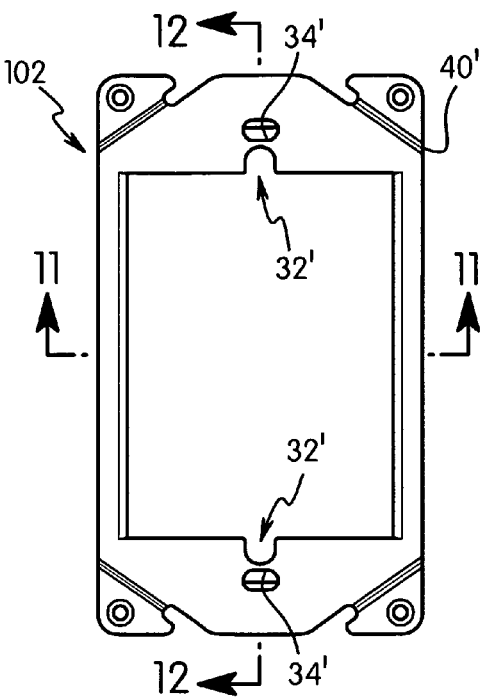
FIG. 8 is a top plan view of the cover plate of FIG. 7.
Figure 9:
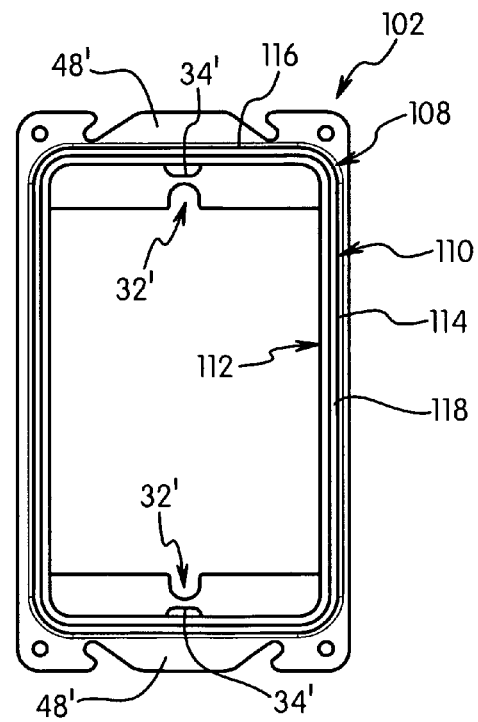
FIG. 9 is a bottom view of the cover plate of FIG. 7.

As shown in FIG. 7, sleeve 108 extends substantially perpendicular from the rear face of top plate 18'. Sleeve 108 is spaced outwardly from notches 32' and spaced inwardly from the outer edges of top plate 18' as shown in FIG. 9.

Sleeve 108 in the embodiment of FIGS. 7-12 has a telescoping structure formed by first ring member 110 and a second ring member 112. First ring member 110 is coupled directly to the rear face of top plate 18' and is preferably formed as a unitary one piece member with top plate 18'. Second ring member 112 has an outer dimension complimenting the inner dimension of first ring member and slides within first ring member 110 in a telescoping manner. In the embodiment illustrated, first ring member 110 and second ring member 112 have substantially the same length. Alternatively, the respective lengths can be different.

First ring member 110 is formed by side walls 114 and end walls 116. End walls 116 have an outer axial end 118 as shown in FIGS. 11 and 12. End walls 116 have an inner surface 120 with an inwardly extending rib 122 adjacent end 118 as shown in FIG. 12. Ribs 122 can extend substantially the entire width of the respective end wall or have a length less than the width of the end wall.

Second ring member 112 has a shape complimenting the shape of first ring member 110 and has a dimension to slide within first ring member 110. Second ring member 112 has side walls 124 and end walls 126. In the embodiment illustrated, end walls 126 have an outer surface formed with a plurality of spaced apart recesses 128 forming parallel grooves for mating with rib 122 on end wall 116 of first ring member 110. Recesses 128 have a dimension corresponding to rib 122 so that rib 122 retains second ring member 112 in a fixed position while allowing sliding longitudinal adjustment of second ring member 112 with respect to first ring member 110. Recesses 128 and ribs 122 cooperate to form a first and second ratcheting mechanism to adjust the axial length of sleeve 108 by allowing the second ring member 112 to slide with respect to the first ring member.

Figure 10:
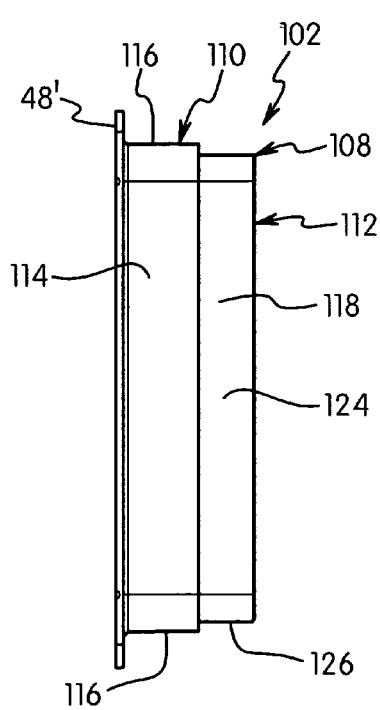
FIG. 10 is a side elevational view of the cover plate.

Assembly 100 is used in a manner substantially similar to the previous embodiment. Electrical box 14' is attached to a wall stud 88' and mud ring 106 is attached to the front face of electrical box 14'. The wall substrate 90' is mounted onto wall stud 88' with an opening aligned with access opening 92' in mud ring 106. Cover plate 102 can be assembled with second ring member 112 in the extended position as shown in FIGS. 10-12.

Sleeve 108 is then inserted into the opening in the wall 90' until the end of inner ring member 112 contacts the outer surface of base plate 76' of the mud ring 106. Cover plate 102 is pressed against the outer surface of the wall 90' so that inner ring member 112 slides within first ring member 110 to adjust the longitudinal length of sleeve 108 to correspond substantially to the depth and spacing between the front face of wall 90' and the front surface of base plate 76' of the mud ring 106. Mounting screws 68' on electrical wiring device 22' pass through the notches 32' of top plate 18' and are threaded into threaded apertures 86' of mounting tabs 84' as shown in FIG. 12. Alternatively, cover plate 102 can be positioned over the access opening in mud ring 106 with the second ring member 112 retracted within the first ring member 110. Second ring member 112 can then be extended using a suitable tool to move second ring member 112 into contact with the mud ring.

In the embodiments of the invention, the adjustable cover plate has a top plate that preferably covers the outer surface of the wall and is coupled to the electrical box after the wall is installed. The cover plate defines an extension between the electrical box or the mud ring attached to the electrical box to the outer surface of the wall and provides a support for positioning the electrical device. The length of the sleeve of the cover plate can be adjusted to correspond to the thickness of the wall structure and the spacing between the outer surface of the wall and the front surface of the electrical box or the mud ring on the electrical box. The cover plate is captured between the electrical wiring device and the electrical box and mud ring by the mounting screws of the electrical wiring device without the need for additional fasteners.

While various embodiments have been chosen to illustrate the invention, it will be understood by those skilled in the art that various changes and modifications can be made without departing from the scope of the invention as defined in the appended claims.

What is claimed is:

1. An electrical box cover plate for coupling to an electrical box, comprising: a planar top member having an access opening with a dimension sufficient to receive an electrical wiring device and having an outer edge with a dimension to contact an outer surface of a wall, said access opening defining an inner edge of said top member, said top member having at least one screw opening for receiving a mounting screw of the electrical wiring device for coupling the cover plate to the electrical box; and a sleeve coupled to a bottom face of said top member around said inner edge, said sleeve extending substantially perpendicular to said top member and being spaced inwardly from said outer edge, and where said sleeve has an axial adjustable length, said screw opening is spaced inwardly from said sleeve.

2. The cover plate of claim 1, wherein
said at least one screw opening is a substantially U-shaped recess on said inner edge of said top plate.

3. The cover plate of claim 1, wherein
said sleeve is integrally formed with said top member as a one piece unit, and said sleeve has an axial dimension with a plurality of frangible lines extending transversely to the longitudinal dimension for reducing a longitudinal length of said sleeve.

4. The cover plate of claim 3, wherein
said frangible lines are spaced apart score lines.

5. The cover plate of claim 1, wherein said sleeve comprises
a first ring member coupled to the bottom face of said top member, and
a second ring member slidingly connected to said first ring member for adjusting an axial dimension of said sleeve.

6. The cover plate of claim 5, wherein
said first ring member includes a first ratcheting mechanism; and
said second ring member includes a second ratcheting mechanism operatively connected to said first ratcheting mechanism for adjusting the longitudinal dimension of the sleeve.

7. An electrical box assembly including an electrical box having a front face with an opening, and an adjustable cover plate, the adjustable cover plate comprising:
a one piece unitary planar top plate having an access opening for receiving an electrical wiring device, a continuous inner edge defined by said access opening, and a continuous outer edge, said top plate having a dimension to contact an outer surface of a wall and to support the electrical wiring device; and
a sleeve coupled to a bottom face of said top plate and having a continuous wall around said inner edge, said sleeve extending substantially perpendicular to said top plate and being spaced inwardly from said outer edge, said sleeve having an axially adjustable length and having an axial end contacting said front face of said electrical box.

8. The electrical box assembly of claim 7, wherein
said top plate has a screw opening with a dimension sufficient to allow a screw to pass through; and
an electrical wiring device positioned within said access opening in said top plate and having a mounting tab contacting a top face of said cover plate, and a mounting screw passing through said mounting tab and screw opening in the cover plate and coupled to said electrical box for securing said cover plate and wiring device to said electrical box.

9. The electrical box assembly of claim 8, wherein
said screw opening in said top plate is a substantially U-shaped recess on said inner edge of said top plate.

10. The electrical box assembly of claim 7, wherein
said sleeve is integrally formed with said top plate as a one piece unit, said sleeve having an axial dimension with a plurality of transverse lines for selectively reducing the axial length of said sleeve.

11. The electrical box assembly of claim 10, wherein
said lines are spaced apart frangible score lines.

12. The electrical box assembly of claim 7 wherein said sleeve comprises
a first ring member coupled to said bottom face of said top plate and coaxially aligned with said access opening; and
a second ring member slidably connected to said first ring member for adjusting an axial length of said sleeve.

13. The electrical box assembly of claim 12, wherein
said first ring member includes a first ratcheting mechanism; and
said second ring member includes a second ratcheting mechanism operatively connected to said first ratcheting mechanism.

14. The electrical box assembly of claim 7, wherein said electrical box further comprises
a mud ring coupled to an open end of said electrical box, said mud ring having a base plate with an outer edge and an inner edge, a collar extending substantially perpendicular to said base plate at said inner edge, and at least two mounting members on a top edge of said collar, said mounting members having a threaded hole; and
the electrical wiring device having a mounting screw extending through an aperture in said top plate and threaded into said threaded hole in said base plate for coupling said wiring device to said cover plate and mud ring and for capturing said cover plate between said wiring device and said mud ring.

15. The electrical assembly of claim 14 wherein
said axial end of said sleeve engages said base plate of said mud ring and is spaced outwardly from said collar.

16. A method for coupling an electrical wiring device to an electrical box, the method comprising:
coupling an electrical box to a support structure having a wall membrane attached thereto, the wall membrane having an opening aligned with an opening in the electrical box;
positioning an adjustable cover plate on an outer surface of the wall membrane opposite the electrical box, the cover plate having a top plate with an inner edge defining an access opening, an outer edge, and a sleeve coupled to a bottom face of the top plate and having an axial end, the adjustable cover plate being positioned with the sleeve extending through the opening in the wall membrane having the axial end of the sleeve abutting the electrical box, and a bottom face of the cover plate abutting an outer surface of the wall membrane; and
coupling the electrical wiring device to the adjustable cover plate and electrical box by a screw extending from the wiring device through an opening in the cover plate inside the sleeve and threaded into a threaded hole in the electrical box.

17. The method of claim 16, wherein said sleeve comprises
a first ring member coupled to said top plate and extending substantially perpendicular to said top plate; and
a second ring member slidably connected to said first ring member, said method comprising adjusting the longitudinal length of said sleeve by sliding said second ring with respect to said first ring.

18. The method of claim 16, wherein said sleeve has a longitudinal length and includes a plurality of transverse frangible score lines for reducing the longitudinal length of said sleeve.

19. An electrical box cover plate for coupling to an electrical box, said cover plate comprising:
a planar top member having an access opening with a dimension to receive an electrical wiring device, said opening defining an inner edge, said top member further having an outer edge with a dimension to contact an outer surface of a wall; and
a sleeve coupled to a bottom face of said top member surrounding said opening and being spaced radially outward from said inner edge and radially inward from said outer edge, said sleeve having an adjustable axial length for contacting an outer surface of the electrical box.

20. The electrical box cover plate of claim 19, wherein said top member includes a screw opening spaced inwardly from said sleeve.

21. The electrical box cover plate of claim 19, wherein said sleeve comprises
   a first member coupled to the bottom face of said top member; and
   a second member telescopically connected to said first member and being axially adjustable with respect to said first member.

22. The electrical box cover plate of claim 21, wherein at least one of said first and second members has a ratcheting adjustable member.

* * * * *